United States Patent [19]
Yamazaki et al.

[11] Patent Number: 5,585,949
[45] Date of Patent: Dec. 17, 1996

[54] ELECTRO-OPTICAL DEVICE

[75] Inventors: Shunpei Yamazaki, Tokyo; Akira Mase, Aichi; Masaaki Hiroki, Kanagawa, all of Japan

[73] Assignee: Semiconductor Energy Laboratory Co., Ltd., Kanagawa-ken, Japan

[21] Appl. No.: 334,383

[22] Filed: Nov. 3, 1994

Related U.S. Application Data

[63] Continuation of Ser. No. 102,956, Aug. 6, 1993, abandoned, which is a continuation of Ser. No. 858,148, Mar. 24, 1992, abandoned.

[30] Foreign Application Priority Data

Mar. 25, 1991 [JP] Japan ................................. 3-084653

[51] Int. Cl.⁶ .................................................. G02F 1/1343
[52] U.S. Cl. ................................ 349/41; 257/56; 359/139
[58] Field of Search .................................. 354/54, 55, 57, 354/58, 59, 60, 61, 87; 357/23.13–257; 340/784; 257/56, 355, 356, 357, 358, 359, 360, 363, 532; 361/340, 784, 345, 92, 56, 9, 111

[56] References Cited

U.S. PATENT DOCUMENTS

| | | | |
|---|---|---|---|
| 4,066,918 | 1/1978 | Heunes et al. | 361/56 |
| 4,131,928 | 12/1978 | Davis et al. | 357/23.13 |
| 4,393,380 | 7/1983 | Hosokawa et al. | 359/59 |
| 4,523,189 | 6/1985 | Takahara et al. | 359/59 X |
| 4,803,536 | 2/1989 | Tuan | 357/23.13 |
| 4,876,584 | 10/1989 | Taylor | 357/23.13 |
| 4,897,757 | 1/1990 | Tailliet | 357/23.13 X |
| 4,930,036 | 5/1990 | Sitch | 361/56 |
| 5,068,748 | 11/1991 | Ukai | 359/87 X |
| 5,087,955 | 2/1992 | Futami | 257/355 |
| 5,144,392 | 9/1992 | Brotherton | 307/318 |
| 5,159,518 | 10/1992 | Roy | 257/357 |
| 5,204,988 | 5/1993 | Sukurai | 257/356 |
| 5,220,443 | 6/1993 | Noguchi | 354/54 |

FOREIGN PATENT DOCUMENTS 0144297  12/1978  Japan ..................................... 359/59

OTHER PUBLICATIONS

The Art of Electronics, Horowitz et al., Cambridge University Press pp. 182–184, 176–177.

*Primary Examiner*—William L. Sikes
*Assistant Examiner*—Kenneth Parker
*Attorney, Agent, or Firm*—Sixbey, Friedman, Leedom & Ferguson, P.C.; Gerald J. Ferguson, Jr.; Evan R. Smith

[57] ABSTRACT

A display device with over voltage protection circuits having zener diode characteristics. The protection circuits have pairs of TFTs connected to resistive dividers. Each resistive divider provide the voltage set levels for one direction of overvoltage application.

8 Claims, 14 Drawing Sheets

ELECTRO-OPTICAL DEVICE

This application is a continuation of Ser. No. 08/102,956, filed Aug. 6, 1993, now abandoned, which is a continuation of Ser. No. 07/858,148, filed Mar. 24, 1992, now abandoned.

DETAILED DESCRIPTION OF THE INVENTION

1. Field of the Invention

The present invention relates to an electro-optical device wherein at pixel locations there are thin-film transistors which act as a driving device of the pixels, and also relates to several kinds of devices which employ this type circuit. More particularly, this invention relates to liquid crystal displays which use, for instance, nematic, cholesteric or smectic materials, projection apparatus (for instance, liquid crystal projectors) provided with displays similar to liquid crystal displays or device for showing static or dynamic images or signals making use of materials which can control optical characteristics by electric information other than liquid crystal.

2. Description of the Prior Art

The electro-optical devices stated above ordinarily employ so-called an active matrix method in which each pixel is provided with a driving device, for instance, one or more thin-film transistors to control the pixel. The thin-film transistor, which has a construction as shown in FIG. 1, to be allocated to each pixel is one in number. The transistor having a construction as shown in FIGS. 2 to 4 is two in number or more, as required. A plurality of pixels are controlled by one or more thin film transistors according to the method. In any case, each pixel is provided with a plurality of vertical and horizontal signal lines. At the intersection of these lines a electro-optical element, for instance, a liquid crystal element is disposed which is controlled by one or more thin-film transistors based on data transmitted through the vertical and horizontal signal lines.

FIG. 1 shows the circuit of a pixel which can be operated using an active matrix method. A plurality of signal lines 103a to 103d are extended from a vertical data driving circuit 101. Likewise, a plurality of signal lines 104a to 104d are extended from a horizontal data driving circuit 102. In FIG. 1, a circuit is shown which drives a electro-optical element located at an intersection on which the signal line 103a crosses with the signal line 104a. That is, a thin film transistor is disposed in the vicinity of the portion where both the signal lines cross each other. The signal line 103a is connected to the gate electrode 105 of the thin film transistor. The signal line 104a is connected to the drain electrode 106 of the thin film transistor. The source electrode 107 of the thin film transistor is connected to a electro-optical element 108, for instance, a liquid crystal. In FIG. 1 an n-channel thin film transistor is utilized as a thin film transistor. However, a p-channel thin film transistor can also be used.

FIG. 2 shows a CMOS (Complementary Metal Oxide Semiconductor Transistor referred to as CMOS hereinafter) inverter-type active matrix method in which a plurality of signal lines 203a to 203d are extended from a vertical data driving circuit 201, as the active matrix method shown in FIG. 1. Likewise, a plurality of signal lines 204a to 204d are extended from a horizontal data driving circuit 202. Different from FIG. 1, signal lines 204a' to 204d' are provided in parallel with the signal lines 204a to 204d. Two thin film transistors are employed to drive an electro-optical element located at a portion on which both the signal lines intersect. As shown in the figure, the thin film transistors are a p-channel transistor and an n-channel transistor. The signal line 203a is connected to gate electrodes 205p and 205n of both of the transistors. The drain electrode 206p of the p-channel thin film transistor is connected to the signal line 204a. The drain electrode 206n of the n-channel thin film transistor is connected to the signal line 204a'. Further, the source electrodes 207p and 207n of p- and n-channel thin film transistors are both connected to a electro-optical element 208, for instance, a liquid crystal element.

FIG. 3 shows a CMOS buffer-type active matrix method in which, as in the active matrix method in FIG. 2, a plurality of signal lines 303a to 303d are extended from a vertical data driving circuit 301. Likewise, a plurality of signal lines 304a to 304d and signal lines 304a' to 304d' are extended from a horizontal data driving circuit 302. As in FIG. 2, a p-channel transistor and an n-channel transistor are employed to drive a electro-optical element located at the portion where both the signal lines intersect. The signal line 303a is connected to the gate electrodes 305p and 305n of both of the transistors. The drain electrode 306n of the n-channel thin film transistor is connected to the signal line 304a. The drain electrode 308p of the p-channel thin film transistor is connected to the signal line 304a'. Further, the source electrodes 307p and 307n of the p-channel and n-channel thin film transistors are connected to a element 308, for instance, a liquid crystal.

FIG. 4 shows a CMOS transfer gate type active matrix method in which as in the active matrix method in FIG. 1, a plurality of signal lines 403a to 403d are extended from a horizontal data driving circuit 401. Likewise, a plurality of signal lines 404a to 404d are extended from a horizontal data driving circuit 402. As in FIGS. 2 and 3, a p-channel transistor and an n-channel transistor are provided to drive a element located at the portion where both the signal lines intersect. The signal line 403a is connected to the source electrodes 406p and 406n of both of the transistors. The gate electrodes 405p and 406n of both of the thin film transistors are connected to the signal line 404a. The drain electrodes 407p and 407n of both of the thin film transistors are connected to a element 405, for instance, a liquid crystal.

A problem in common relative to these circuits is that there is no circuit provided to protect the thin film transistor in case a surge voltage, such as a static electricity is generated between each driving circuit and each thin film transistor. In particular, an excessively high voltage applied to the gate electrode of the thin film transistor will lead to the breakdown of the gate insulating film, resulting in an inability to function as a switching element.

Further, an excessive voltage supplied between the source and the drain of the thin film transistor also causes to increase the voltage between the gate electrode and the channel forming region which results in the indirect breakdown of the gate insulating film. Consequently, the thin film transistor will be heavily damaged. In some cases the transistor will be broken. The main reason of this excessively high voltage comes from static electricity generated from one cause or another. In many cases the current capacity is not very great. Such an excessively high voltage, if generated, is preferably removed quickly.

SUMMARY OF THE INVENTION

It is the object of this invention to provide a circuit for protecting the thin film transistor at suitable locations by suitable manufacturing methods so that the thin film transistor is protected to improve the reliability and lifetime of the elector-optical device stated above.

It is desirable that the protection circuit of the thin film transistor is provided in the periphery of the display portion of the device. Further the circuit is desirably prepared at the same time as the thin film transistor of the display portion is prepared. Still further, it is necessary that a normal driving voltage can be passed through the protection circuit but an excessively high voltage is prevented from passage therethrough and is properly by-passed. An excessively high voltage for the thin film transistor is generally referred to as a voltage of most ten times as high as the threshold voltage of the gate voltage, that is, 50 volts or more. This value is, however, greatly varied according to the structure of the thin film transistor. On the other hand, the normal driving voltage is at largest a few times as high as the threshold voltage of the gate voltage. Ordinarily, the value ranges from 10 to 40 volts. The value, however, is greatly varied depending upon the structure of the thin film transistor.

According to the present invention, in order to satisfy such conditions as stated above, protection circuits are provided at the display element portion and the driving circuit portions in the vicinity thereof. Protection circuits are built by making use of the zener characteristics of the diodes as shown in FIGS. 8 and 9. Other than a p-n junction, the diode can be made available from a p-i junction, as n-i junction, a p-i-n junction, a p-i-p-i junction . . . an n-i-n-i junction . . . a p-i-n-i-p-i-n junction and so on which are combinations of p-type, i-type and n-type. In addition, the diode which employs the junction between a semiconductor and a metal, i.e., a Schottky junction, can also be used.

FIG. 8(A) shows an example of a protection circuit which uses diodes. In this example, the $V_{DD}$ potential is positive, for instance, 5 to 50 volts. In principle, diodes have a current-voltage property as shown in FIG. 8(B). A certain level of a reverse voltage applied to the diode causes a sudden increase in the current therethrough. This property is called a Zener characteristic. The threshold voltage $V_{th}$ wherein such a sudden increase in the current appears in the diode is, for instance, 5 to 20 volts. It should be noted that a connection of a plurality of the diodes in series allows $V_{th}$ to be made greater.

If the electric potential at point A in the FIG. 5(A) is an adequate positive value, diodes D1 and D3 each serve as a resistance near a normal conductor. On the other hand, diodes D2 and D4 function as a very high resistance. Consequently, the electric potential at point B is almost the same potential as $V_{DD}$. Likewise, the electric potential at the point A is an adequate negative value, the electric potential at the point B is the same potential as the earth potential.

However, when an excessively large positive voltage exceeding $V_{th}$ is applied to the point A, each diode acts as a low resistance. If the values of the resistance of D1 and D2 are substantially the same and far less then R1, almost all the current runs to D2. The same phenomenon can be seen if an excessively high voltage is applied to the point A. Almost all the current passes through D1 so that the potential at the point B is kept low. The connection of a plurality of such circuits in series effectively prevents an excessively large current from passing therethrough.

FIG. 9 (A) shows another example where a diode is used. The diode shown in the figure is called a zener diode. This diode has a structure wherein two diodes are connected in the reverse direction each other. For instance, this diode is made from a p-n-p (n-p-n) junction, and n-i-n (p-i-p) junction, a p-i-n-i-p (n-i-p-i-n) junction or combinations of these junctions. The characteristic of the zener diode is, as shown in FIG. 9 (B), that the diode acts as an extremely large resistance at the voltages of $-V_{th}$ and more to $+V_{th}$ and less, but the voltages exceeding there values applied thereto cause the values of resistance to go down.

When the electric potential is a positive value of $V_{th}$ or less or a negative value of $V_{th}$ or more, this zener diode D1 acts as an extremely great resistance. The electric potential at the point B is almost the same as the electric potential at the point A. However, when the electric potential at the point A exceeds the positive or negative value of $V_{th}$, D1 functions as a great resistance. When the resistance of D1 is sufficiently greater than R1, almost all the current will flow through D1 so that the electric potential at the point B is kept low. A connection of a plurality of such diodes in series prevents an overvoltage more effectively.

A protection circuit which has the same effect can be prepared by the use of thin film transistors. Examples are shown in FIGS. 6 and 7. FIG. 8(A) shows a circuit wherein only when a positive overvoltage is applied, the circuit functions to bypass the overvoltage. That is, an adequate selection of the resistance values of resistance R1 and R2 allows a design wherein the gate voltage of an n-channel transistor and the voltage across the source and the drain can be adequate values. For instance, if R1/R2=10, and when the electric potential at the point A is +50 V (with the electric potential at the point B set as a reference), the potential at the gate of the thin film transistor T1 can be +5. If the threshold voltage of the thin film transistor T1 is +5 V, this transistor will function so that a current runs across the source and the drain. When the potential at the point A exceeds +50 V, the potential at the gate electrode is +5 V or more. Consequently, the thin film transistor functions to have an effect of eliminating an overvoltage. In this case, if a p-channel transistor is employed as a thin film transistor, this transistor acts only when a negative overvoltage is applied thereto. On the other hand, if the potential at the point A is less than +50 V, the thin film transistor functions as a high resistance so that the voltage does not drop too much. Accordingly the normal signal voltage is not bypassed.

As stated before, the circuit shown in FIG. 6 (A) acts only when, for instance, a positive overvoltage is applied thereto. The circuit does not function when a negative overvoltage is applied. That is, the circuit acts only when an overvoltage with a plus sign is applied thereto. Actually, however, a positive overvoltage or a negative overvoltage may be applied. The circuit should correspond to either case. FIG. 6 (B) shows a circuit to realize the above purpose. A selection of the values of the resistances R2, R3 and R4 allows an adequate control of the voltage across the source and the drain electrode of the two n-channel transistors as well as the voltage at the gate electrode. For example, if R1/R2=10, R4/R3=10 and the potential at the point A is +50 V, the potential at the gate electrode of the thin film transistor T1 is +5 V, and the potential at the gate electrode of T2 is +45 V. At this time a source-drain current will run to T1, as stated above. A bypass current will not flow through T2, because the potential of the channel forming region, with a gate insulation film interposed, is lower than the potential of the gate electrode.

Contrary to the above, if the potential at the point A is −30 V, the potential at the gate electrode of T1 is −5 V, and the potential is lower than the potential (0 V) of the channel forming region so that no bypass current will flow. However, the potential at the gate electrode of T2 is −45 V, and the potential is higher than the potential (−50 V) of the channel forming region so that a bypass current will flow. If the potential at point A is between −50 V and +50 V, no current will flow through either of the transistors. Consequently, the normal signal current will scarcely be damaged.

FIG. 6 (C) shows a complex of the above circuits. The overvoltage attenuated through the first protection circuit (the upper portion of FIG. 6 (C)) is passed through a resistance R5 to be further attenuated through the second protection circuit (the lower portion of FIG. 6 (C)).

FIG. 6 relate to protection circuits which are constituted by the use of either of an n-channel thin film transistor or a p-channel thin film transistor. The use of both a p-channel thin film transistor and an n-channel thin film transistor enables a protection circuit to be constituted as shown in FIG. 7. FIG. 7 (A) relates to a description of the basic operation of a protection circuit according to this method as follows:

As in the case of FIG. 6, a selection of adequate resistances R1 and R2 allows the voltage across the source electrode and the drain electrode as well as the potential of the gate electrode to be made adequate values. As an example, on the assumption that R1/R2=10, if the potential at the point A is +50 V with the point B set as a reference, the voltages of the gate electrodes of the thin film transistors are each +5 V. Only the T1, which is an n-channel thin film transistor, functions as a bypass.

On the contrary, when the potential at the point A is −50 V, the potentials of the gate electrodes of both the thin film transistors are −5 V. At this time, only T2, which is a p-channel thin film transistor, acts as a bypass. FIG. 7 (B) shows a combination of the circuits stated above.

When this method is employed, the break-down voltage of the thin film transistor in the protection circuit determines the break-down of the protection circuit. If the allowed value of the voltages across the gate electrode and the source electrode of the thin film transistor is 50 V, the use of the protection circuits as stated above withstands up to ±500 V to function as a protection circuit. As a matter of course, a selection of the value of the resistance permits changing the value of the break-down with ease.

In FIGS. 6 and 7, no description has been made concerning the resistance across the source electrodes and the drain electrodes of the thin film transistors used. It is important to consider this value when the voltage across the source electrode and the drain electrode is determined. For instance, values of $10^8$ to $10^{11}$ Ω for ordinary n-channel thin film transistors, which have a channel length of 10 μm and a channel width of 10 μm, have been obtained. The values seem to be rather great. But $1^{12}$ Ω is the value of the resistance of a linear-shaped element provided with a length of 10 μm, a width of 1 μm and a thickness of 0.1 μm, the element being prepared from high-resistant polycrystalline silicon with a resistivity of $10^8$ Ω-cm or from amorphous (semi-amorphous) silicon. The resistance of the thin film transistor as stated above can be substantially ignored.

For a resistance to be used in these protection circuits, materials mainly comprising silicon can be used as noted above. Metallic materials, alloys of metals with silicon or compound semiconductors of several kinds (for instance, the oxide, indium oxide or indium tin oxide) can also be used.

Next, a description will be made of the methods for preparing the protection circuits of the driving circuits for the electro-optical devices according to the present invention. The features of the protection devices according to the present invention is that the circuits can be prepared in parallel with the preparation of the driving circuits (the circuits which contains the thin film transistors as shown in FIGS. 1 to 4). The examples will be shown as follows:

FIG. 10 shows an example of the methods for preparing a thin film transistor to be used in the driving circuit as well as a zener diode to be provided in the periphery thereof. At first on a suitable substrate on which a electro-optical element is to be mounted. A semiconductor film of 10 nm to 10 μm in thickness, preferably 50 nm to 1 μm, is provided. The film is selectively etched to form semiconductor regions 1001 and 1002. The size of this semiconductor regions depends upon the size of the element to be formed later. The length of the one side is 100 nm to 100 μm for ordinary thin film transistors. A glass material, for example, quartz glass, AN glass or NO glass is selected as a substrate material. A substrate material on which another film has been formed is used as required. For instance, a low pressure CVD (chemical vapor deposition is referred to as CVD hereinafter) method, a plasma CVD method or a photo assisted CVD method can be used for a method for forming a semiconductor film. Immediately after forming this film or after being subjected to another process, the semiconductor film can be heat-treated at 400° to 800° C., preferably at 500° to 650° C., or irradiated with an intense light beam, for instance, a laser beam to improve the crystallinity of the film so that the characteristics as a semiconductor can be improved.

Next, on the semiconductor regions thus formed, films 1003 and 1004 functioning as a gate insulating film are formed in thickness of 10 nm to 1 μm, preferably 10 nm to 200 nm. Silicon oxide or silicon nitride, for instance, is used for this film. The preparation method is selected from among, for instance, the low pressure CVD method, the plasma CVD method, the photo assisted CVD method, the thermal oxidizing (nitriding) method, the light irradiation oxidizing (nitriding) method or the plasma oxidizing (nitriding) method, in conformity with the thickness and the characteristics of the film to be formed. At the last stage, a film 1005 of 50 nm to 10 μm, preferably 100 nm to 2 μm in thickness which is to be a material for a gate electrode, is formed to cover the films. As a material for the gate electrode, semiconductor materials, for instance, amorphous silicon (germanium), semi-amorphous silicon (germanium), polycrystalline silicon (germanium), silicides, for instance, tungsten silicide, aluminum silicide or molybdenum silicide or metals, for instance, tungsten, molybdenum or aluminum or alloys thereof are employed to form a single layer of one material or a multiple layer of several materials combined. For example, a construction of the film is available, wherein a tungsten layer 100 nm to 2 μm in thickness is provided on an amorphous silicon layer 10 to 100 nm in thickness which is doped with phosphorus. Thus FIG. 10 (A) is obtained.

Next, the film 1005 is selectively left on the insulating film to form regions 1006 and 1007. In some cases these regions can be formed into gate electrodes later. Further, by the known impurity introduction methods, for example, the ion implantation method or the thermal diffusion method, regions of a great conductivity, so called impurity regions 1008 to 1011 are formed wherein a large amount of impurities are contained in the semiconductor regions 1001 and 1002. At this time, for instance, the regions 1006 and 1007 or a photoresist lying thereon act as a mask in introducing impurities so that the impurities do not much infiltrate into the under layer. This is called, generally, a self-alignment process. Further the impurity introduction by the ion implantation method causes the crystallinity of the semiconductor regions to be heavily damaged. Consequently it is required that the film is subjected to heat treatment at 400° to 800° C., preferably at 500° to 650° C., or subjected to a laser beam irradiation from the front or the back side so that the crystallinity of the thin film can be increased and also the characteristics as a semiconductor can be improved. Thus FIG. 10 (B) is obtained.

At the final stage, regions 1006 and 1007 are covered to form an insulating film. Then the region 1007 and the impurity regions 1008 to 1011 are provided respectively with a hole for forming electrodes 1012 to 1018. Thus, a zener diode 1017 and an n-channel thin film transistor 1018 are prepared to obtain FIG. 10 (C). The circuit wherein such a zener diode and a thin film transistor are mixed is, for instance, the circuit provided with a protection circuit as shown in FIG. 9.

Then, in FIG. 10 (C), the region 1008 is not provided with an electrode and the signal from the outside does not control the conductivity of the semiconductor region 1002. Consequently the element 1017 does not function as a thin film transistor. When the element 1017 is provided with an electrode at the final process, the element will be a thin film transistor. Accordingly this shows that there is a degree of freedom of design, because a large number of (incomplete) elements as shown in FIG. 10 (B) are prepared on the substrate and afterwards these elements in the display device region or the peripheral region are to be provided with electrodes as required so that one of the elements can be designed to function as a thin film transistor and another can be designed to function as a diode.

FIGS. 11 (A) to (E) show an example of the method for preparing a thin film transistor to be used in the driving circuit as well as a thin film transistor to be provided in the periphery thereof. At first the substrate is provided thereon with a semiconductor film 10 nm to 10 µm, preferably 50 nm to 1 µm in thickness. Then the film is subjected to etching selectively to form semiconductor regions 1101 to 1104.

Next a film 1105 acting as a gate insulating film is formed on the semiconductor region thus formed. Lastly a film 1106 which will be a material of the gate electrode is formed to cover the film 1105. Thus FIG. 11 (A) is obtained.

Then the film 1106 is left selectively on the insulating film to form gate electrodes 1107 to 1110. Thus FIG. 11 (B) is obtained.

Further, the semiconductor regions 1101 and 1104 are masked by, for instance, a photoresist to expose the semiconductor regions 1102 and 1103 only, P-type impurity regions 1111 to 1114 are formed in the semiconductor regions 1102 and 1103 through a self-alignment process by a known impurity introduction method (FIG. 11 (C)). Still further, likewise, the semiconductor regions 1102 and 1104 are masked to expose the semiconductor regions 1101 an 1104. Impurities are introduced to form n-type impurity regions 1115 to 1118. Thus, FIG. 11 (D) is obtained.

At the last stage the gate electrodes 1107 to 1110 are covered to form an insulating film. Then afterwards each electrode and impurity region is bored to provide an opening for forming an electrode so that electrodes 1119 to 1128 are formed. In this way a circuit is prepared wherein a p-channel thin film transistor and an n-channel thin film transistor are mixed together. Thus FIG. 11 (E) is obtained. Such a circuit wherein a p-channel thin film transistor is mixed with a n-channel thin film transistor is used in the device provided with a protection circuit as shown in, for instance, FIG. 7.

FIG. 13 is a top view which shows an example of the protection circuits prepared by the manufacturing methods as stated above. At first, semiconductor regions 1301 and 1302 are formed and then a film (not shown in the drawing) which acts as a gate insulating film is formed. Next, a gate electrode 1303 spinning both of the semiconductor regions is formed. A p-type impurity region is formed in the semiconductor region 1301 and an n-type impurity region is formed in the semiconductor region 1302. Further, a layer insulating film (not shown in the drawing) is formed. Metal electrodes 1304 and 1305 to be laid across both of the semiconductor regions are formed simultaneously with a signal line 1306 with a metal material, for instance, aluminum which is a good electric conductor. Then, leads 1307 and 1308 acting as a resistance are formed with a resistive material, for instance, indium tin oxide or with, for example, high-resistive amorphous silicon, to form a protection circuit.

FIG. 12 shows an example of methods for preparing a thin film transistor to be used for driving circuit and a diode to be provided in the periphery thereof. At first a substrate is provided with a semiconductor film, which is then subjected to etching selectively to form semiconductor regions 1201 to 1204.

Next the semiconductor regions thus formed are provided thereon with a film 1205 which acts as a gate insulating film. Lastly a film 1206 which is to be a material of the gate electrode is formed to cover the film 1205. Thus FIG. 12 (A) is obtained.

Next the film 1206 is selectively left on the insulating film to form gate electrodes 1207 and 1208. Thus FIG. 12 (B) is obtained.

Further, parts of the semiconductor regions 1201 and 1202 and all of the semiconductor 1204 are masked by, for instance, a photoresist. The remaining parts of the semiconductor regions 1201 and 1202 as well as all of the semiconductor region 1203 are exposed. By a known method for introducing impurities, p-type impurity regions 1209 and 1210 are formed in parts of the semiconductor regions 1201 and 1202. Further, p-type impurity regions 1211 and 1212 are formed in the semiconductor region 1202 through a self-alignment process (FIG. 12 (C)). Still further likewise, the impurity-containing regions of the semiconductor regions 1201 and 1202 as well as all of the semiconductor region 1203 are masked to expose the remaining parts of the semiconductor regions 1201 and 1202 as well as all of the semiconductor region 1204. Impurities are introduced thereinto to form n-type impurity regions 1213 to 1216. Thus FIG. 12 (D) is obtained.

Lastly after being subjected to a process of covering the electrodes 1207 and 1208 to form an insulating film, holes for forming electrodes are bored in each of the gate electrode and the impurity regions to form electrodes 1217 to 1224. In this way a circuit wherein p-i-n diodes 1225 and 1226, a p-channel thin film transistor 1227 and an n-channel thin film transistor 1228 are mixed together is prepared. Thus FIG. 12 (E) is obtained. Such a circuit wherein diodes, a p-channel thin film transistor and an n-channel thin film transistor are mixed together is used in the device which is provided with protection circuits as shown in, for instance, FIG. 8. In particular, an extended electrode 1218 can be employed as a wiring which includes a resistance as shown in FIG. 8.

FIG. 14 shows a method for preparing a device which is provided with a stacked type p-channel thin film transistor and an n-channel thin film transistor. The methods used in FIGS. 10 to 12 are employed here. At first, semiconductor regions 1405 and 1406 having an n-type impurity region are prepared on the substrate. Then thereon gate electrodes 1403 and 1404 with a gate insulating film interposed therebetween are prepared to obtain n-channel thin film transistors 1401 and 1402. When the portions which can be made the gate electrode of the thin film transistors are not electrically connected to outside, these elements function as diodes, as stated before. Thus FIG. 14 (A) is obtained.

Next a layer insulating film 1407 is formed. Semiconductor regions 1408 and 1409 having a p-type impurity region are formed thereon. Further thereover, gate electrodes 1410 and 1411 are prepared with a gate insulating film interposed to obtain p-channel thin film transistors 1412 and 1413. Thus FIG. 14 (B) is obtained.

Lastly after a process of forming an overall layer insulating film, required electrodes, for instance, 1414 to 1423 are formed. In this way a circuit having p-channel thin film transistors mixed with n-channel thin film transistors as shown in FIG. 14 (C) is obtained.

DESCRIPTION OF THE PREFERRED EMBODIMENTS

Preferred Embodiment 1

Figure 1:
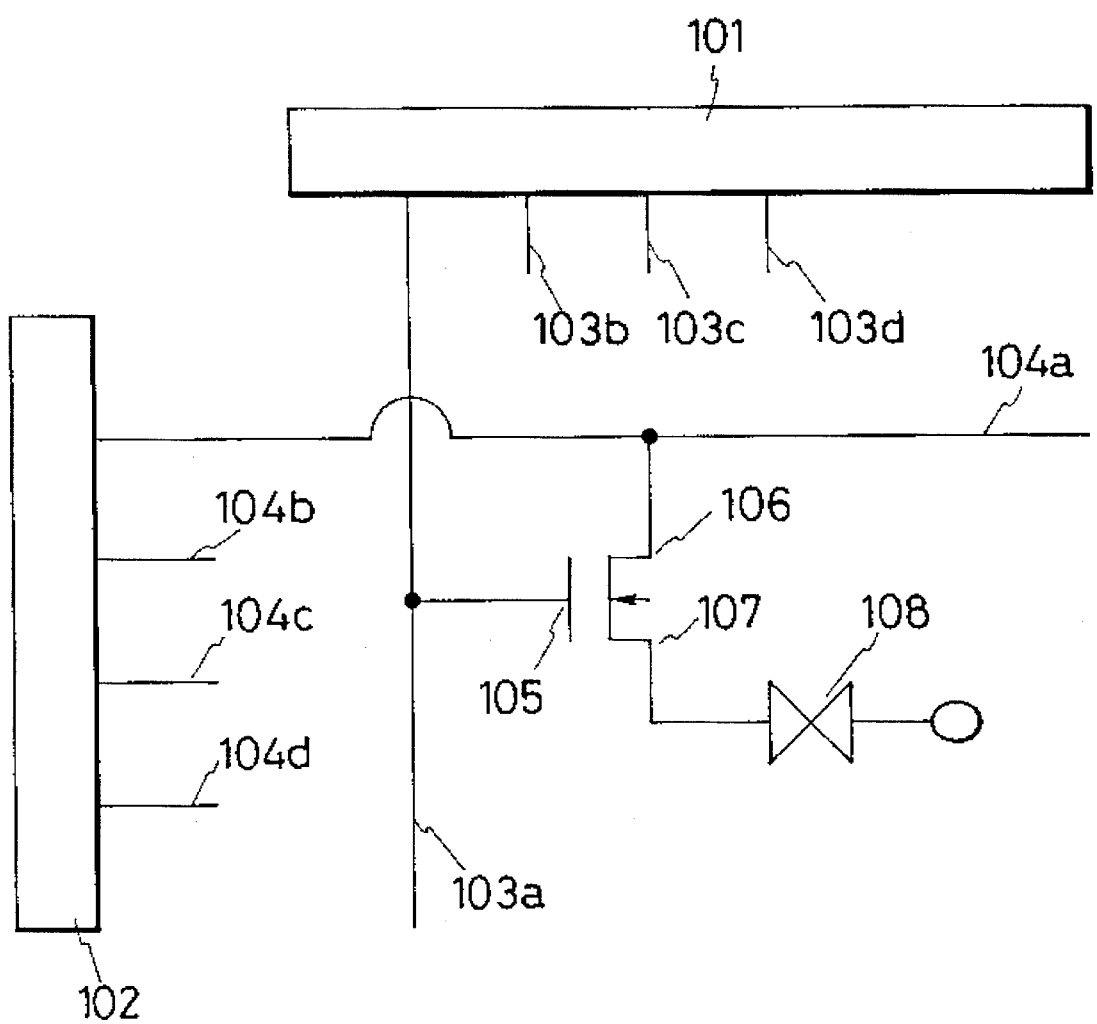
FIG. 1 shows an example of the construction of a display element portion.
Figure 2:
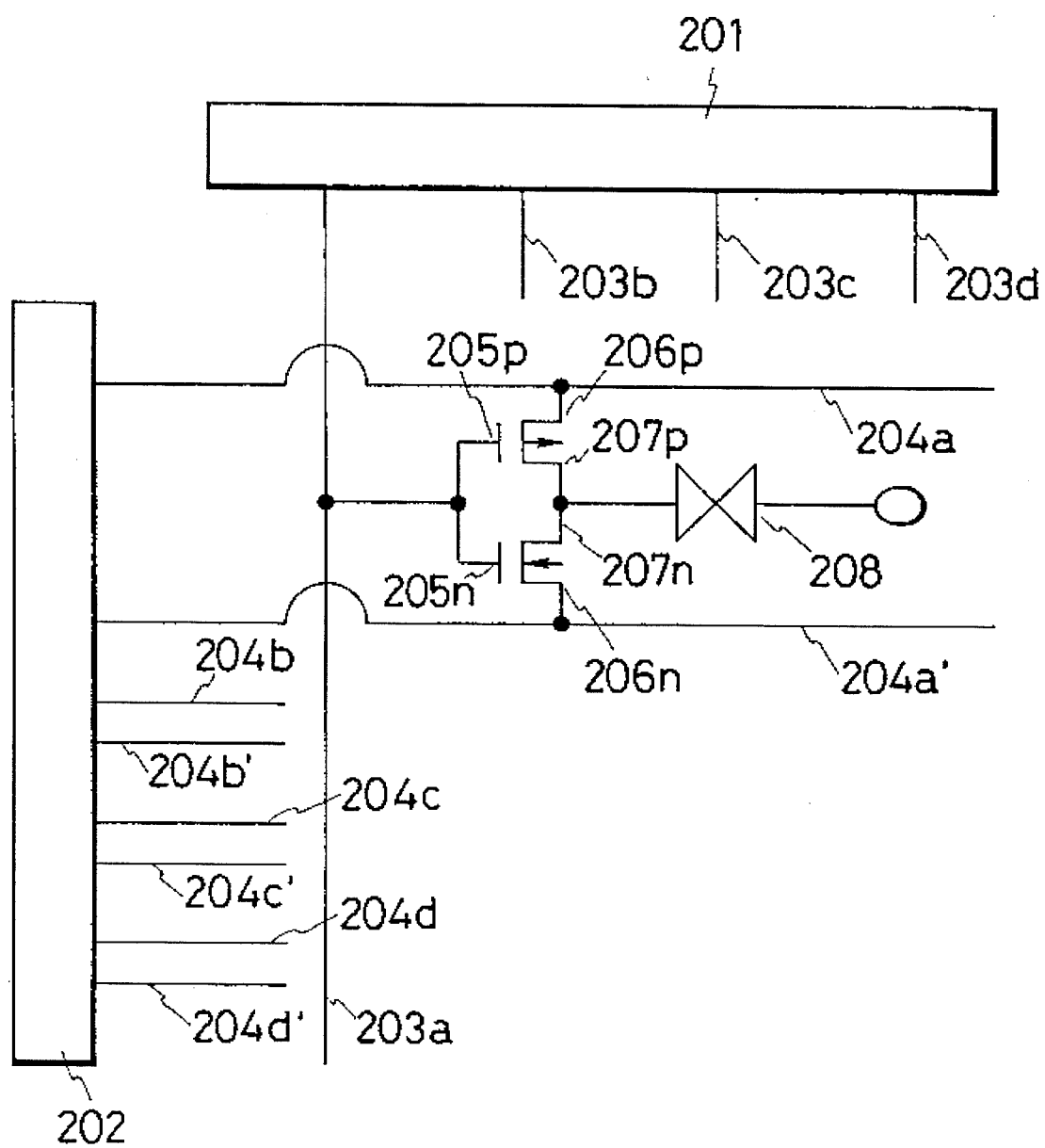
FIG. 2 shows another example of the construction of a display element portion.
Figure 3:
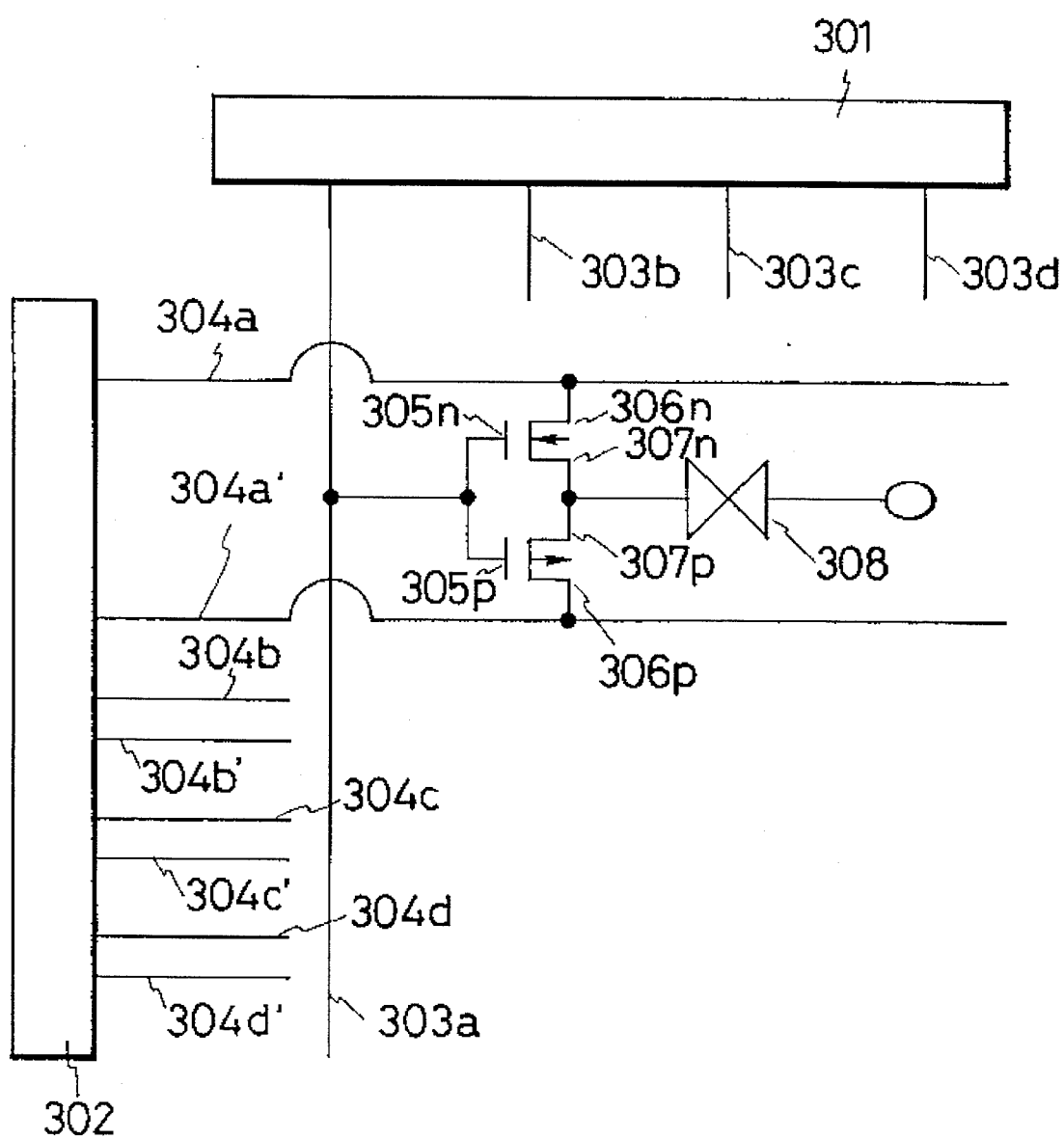
FIG. 3 shows still another example of the construction of a display element portion.
Figure 4:
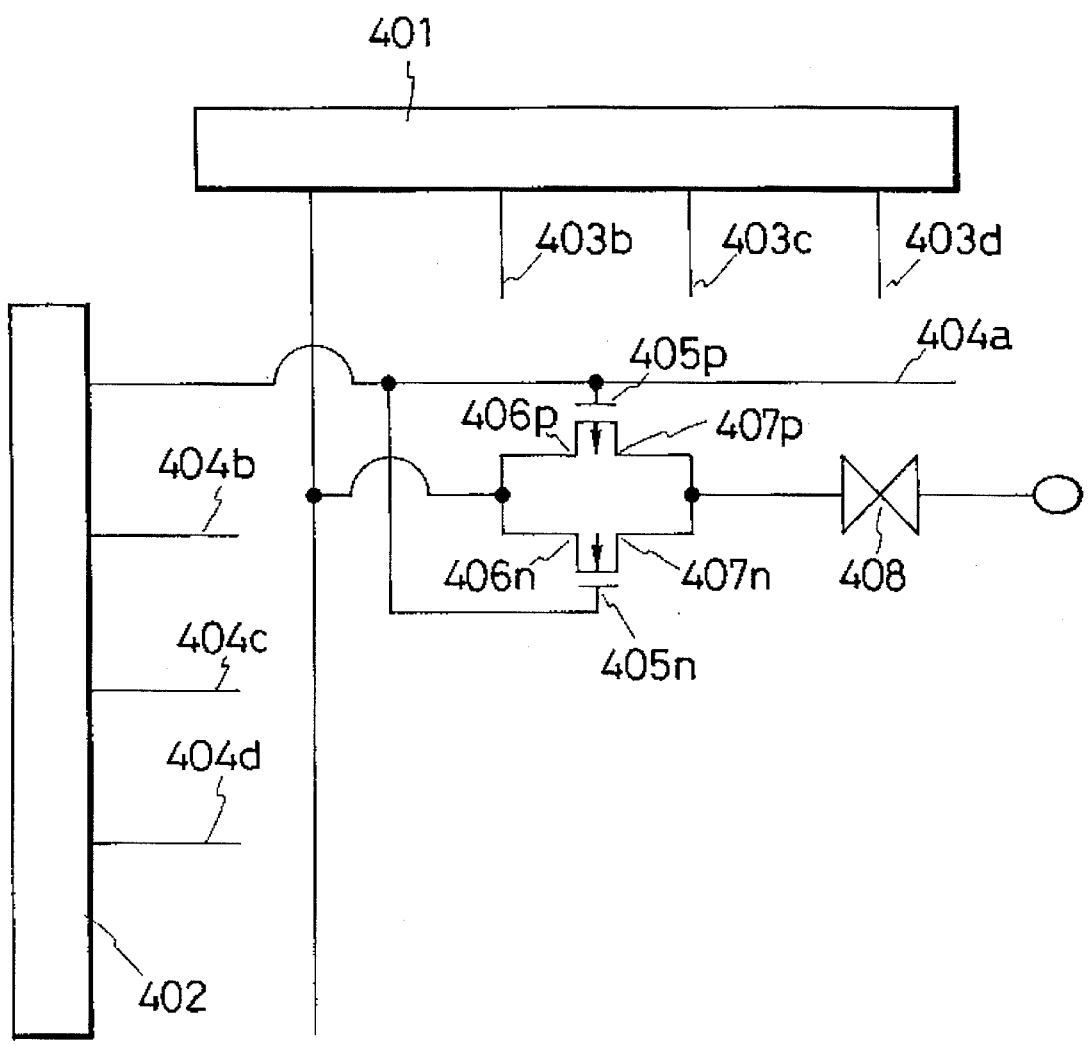
FIG. 4 shows one more example of the construction of a display element portion.
Figure 5:
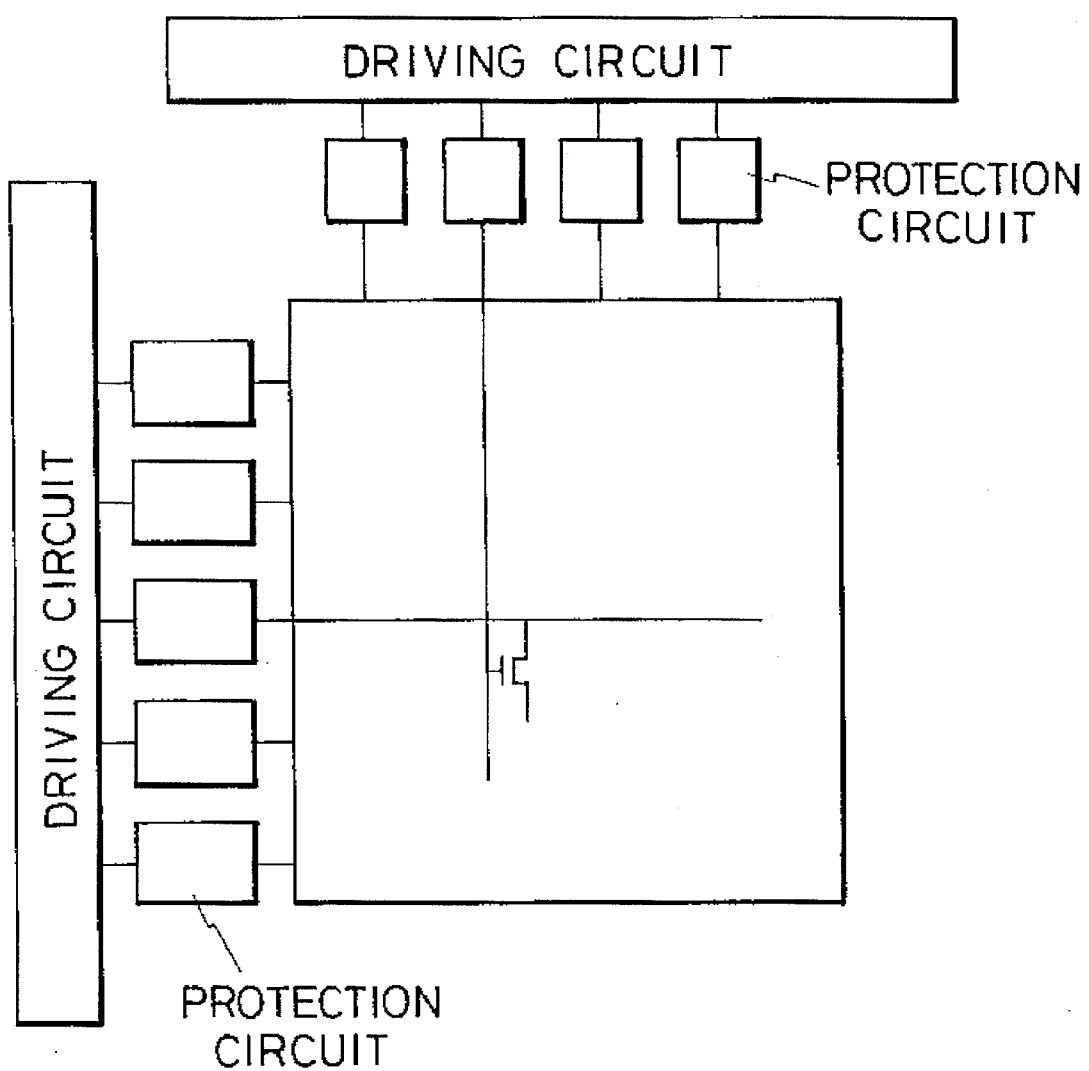
FIG. 5 shows an example of a protection circuit used according to the present invention.
Figure 6A:
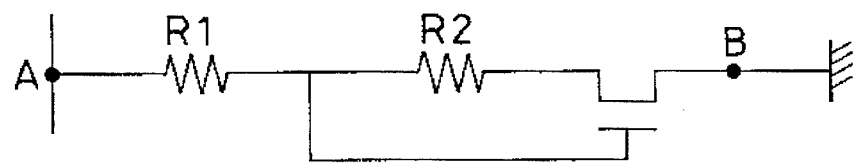
FIGS. 6A, 6B and 6C show another example of a protection circuit according to the present invention.
Figure 6B:
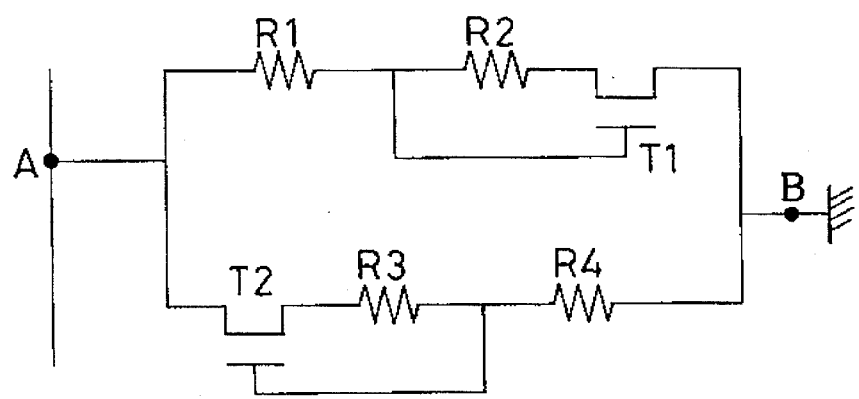
Figure 6C:
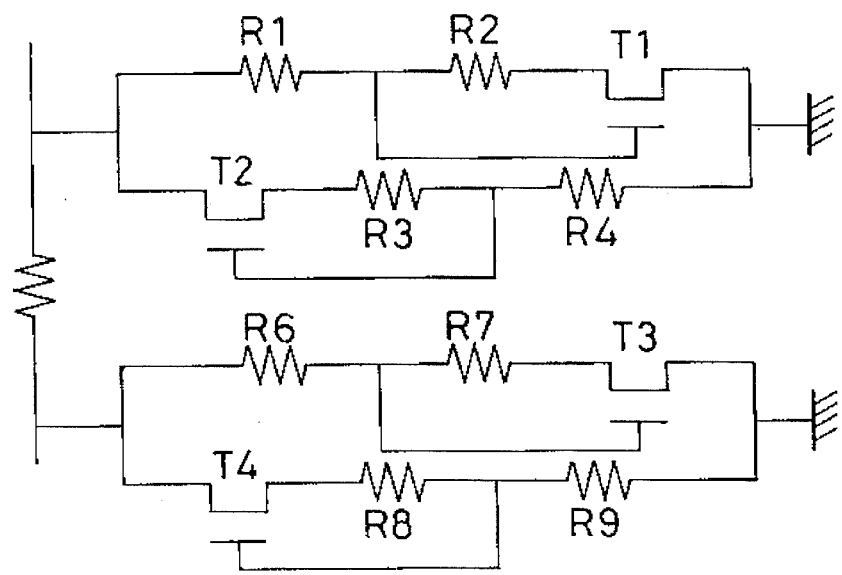
Figure 7A:
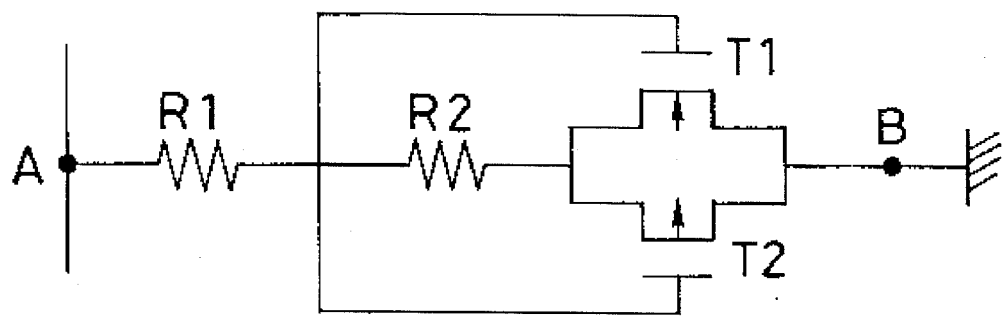
FIGS. 7A and 7B show still another example of a protection circuit according to the present invention.
Figure 7B:
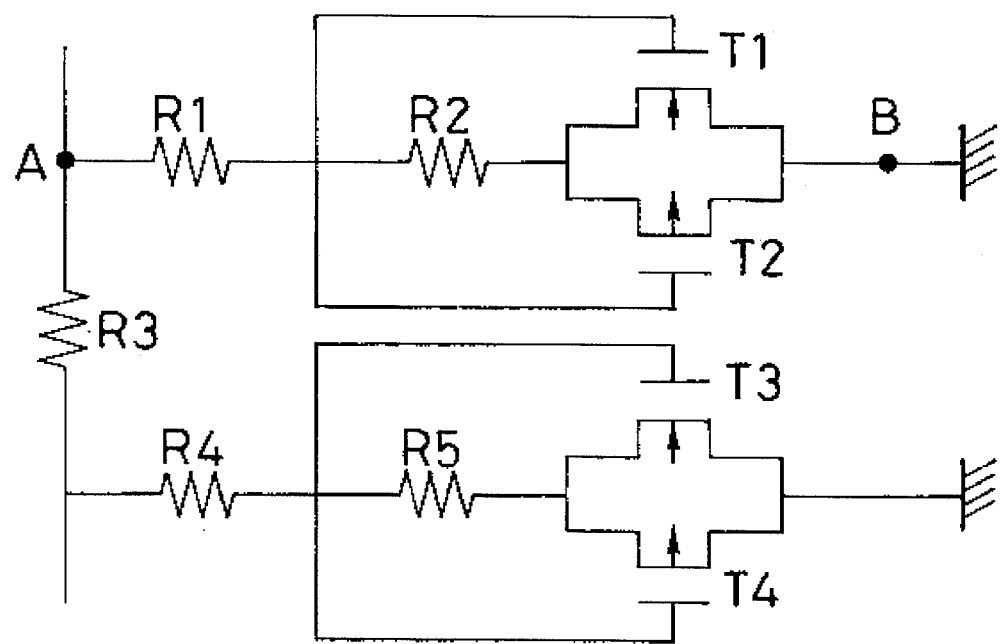
Figure 8A:
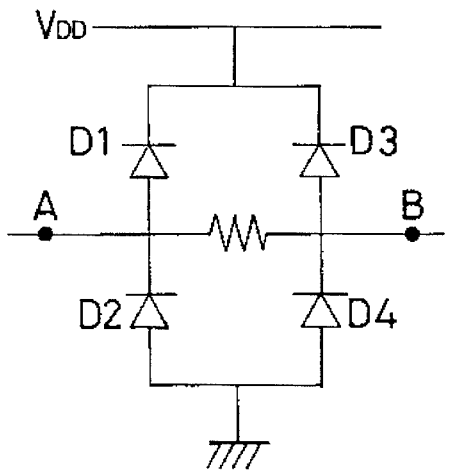
FIGS. 8A and 8B shows one more example of a protection circuit according to the present invention.
Figure 8B:
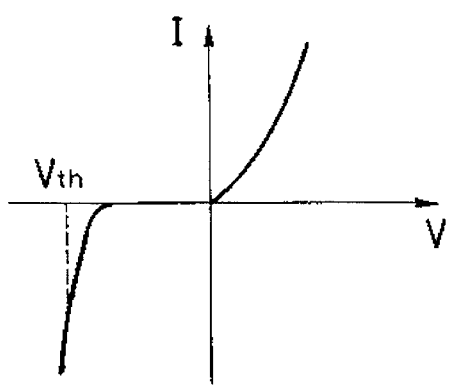
Figure 9A:
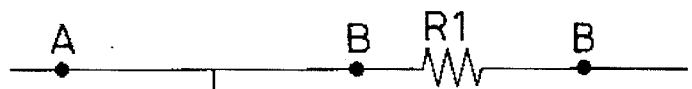
FIGS. 9A and 9B shows still more example of a protection circuit according to the present invention.
Figure 9A:
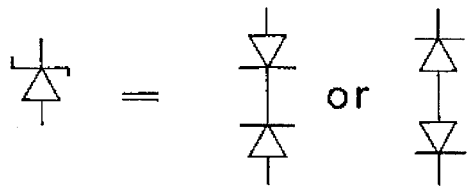
Figure 9B:
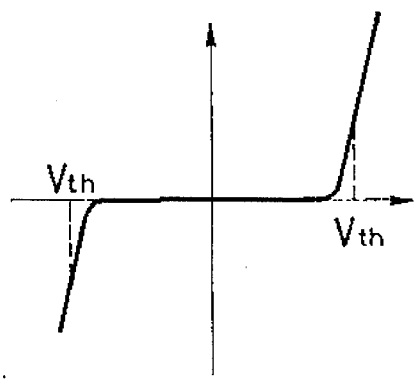
Figure 10A:
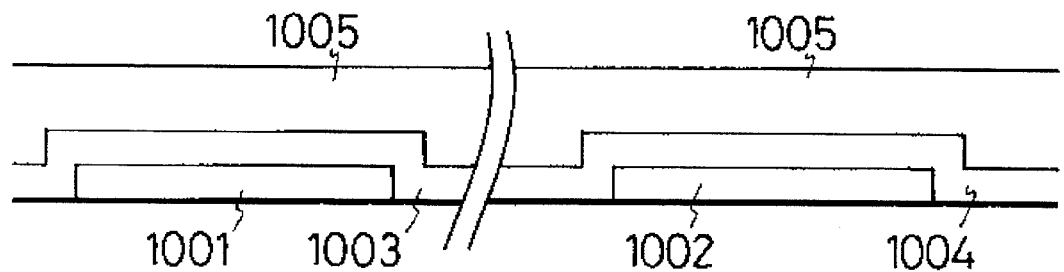
FIGS. 10A, 10B and 10C show a method for preparing a protection circuit according to the present invention.
Figure 10B:
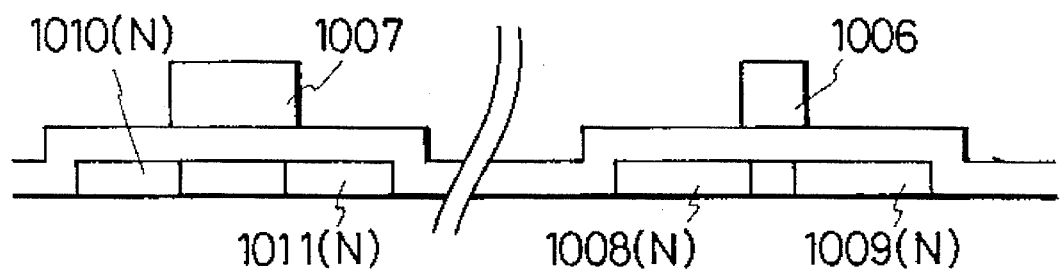
Figure 10C:
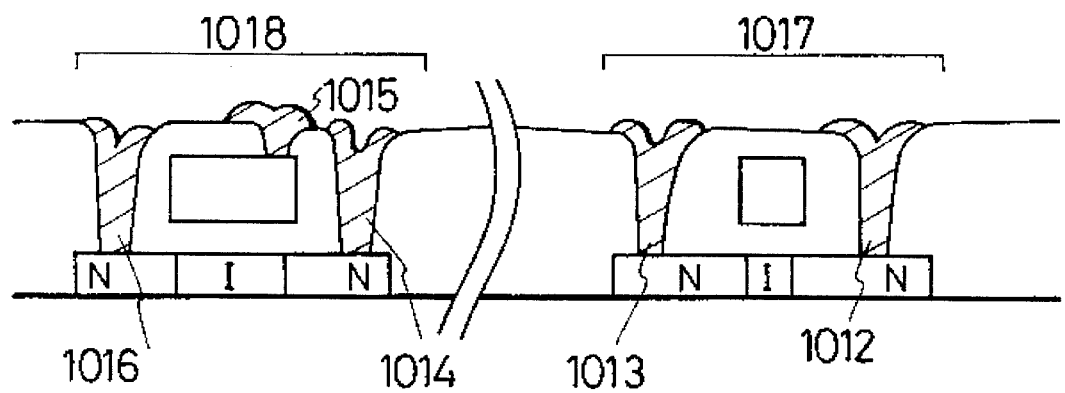
Figure 11A:
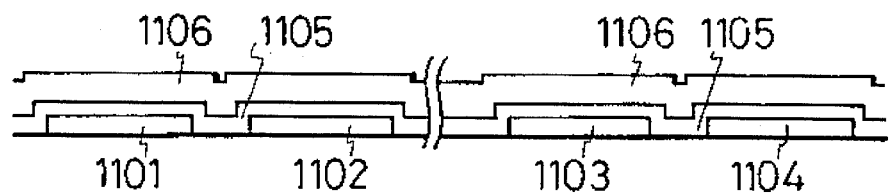
FIGS. 11A to 11E show another method for preparing a protection circuit according to the present invention.
Figure 11B:
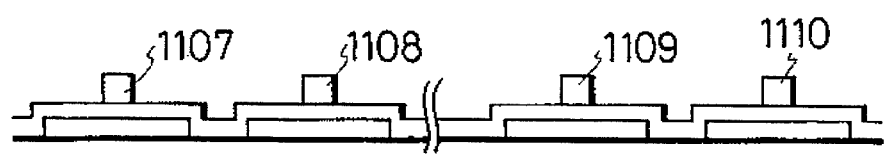
Figure 11C:
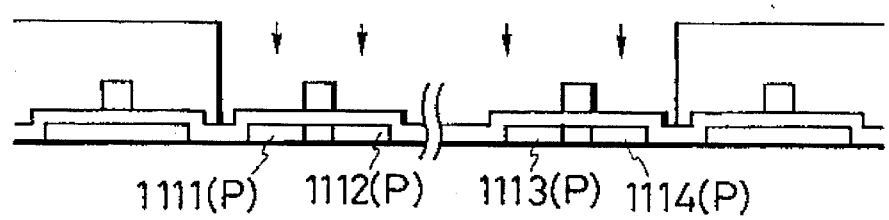
Figure 11D:
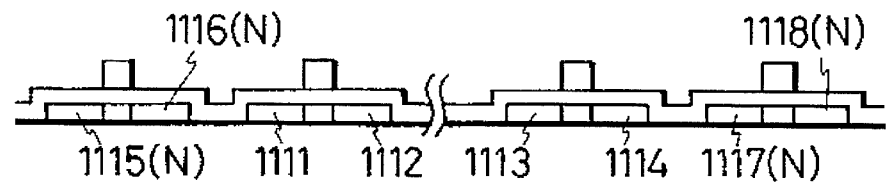
Figure 11E:
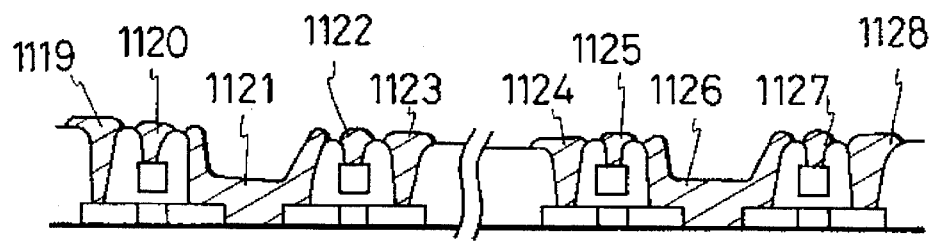
Figure 12A:
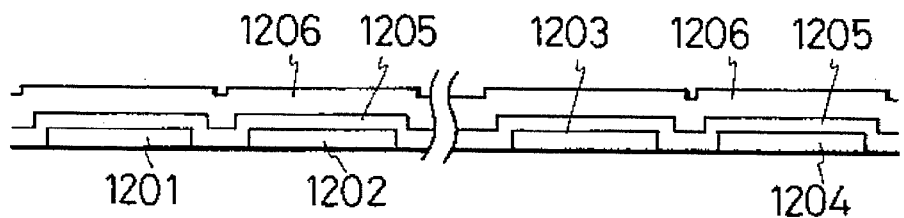
FIGS. 12A to 12E show still another method for preparing a protection circuit according to the present invention.
Figure 12B:
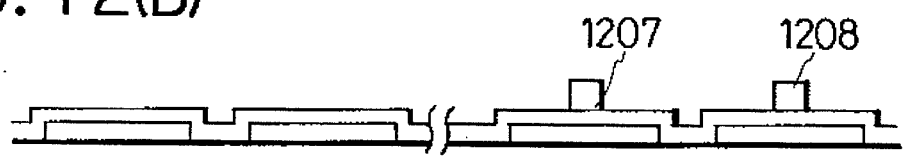
Figure 12C:
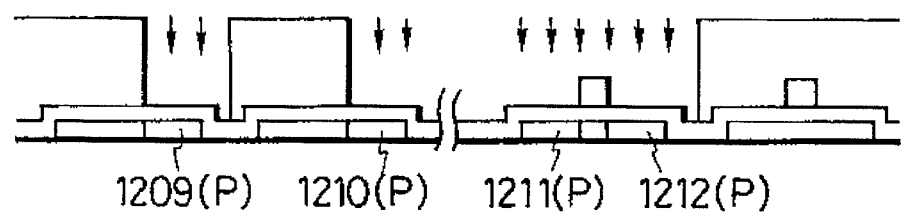
Figure 12D:
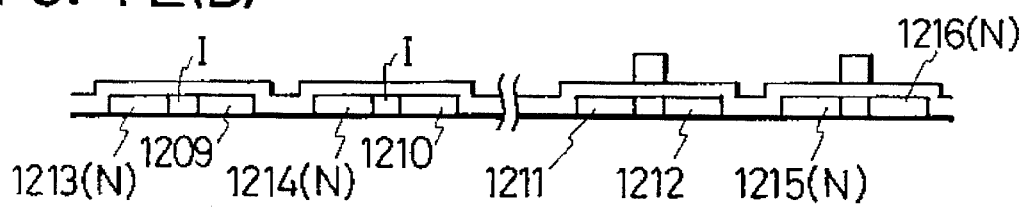
Figure 12E:
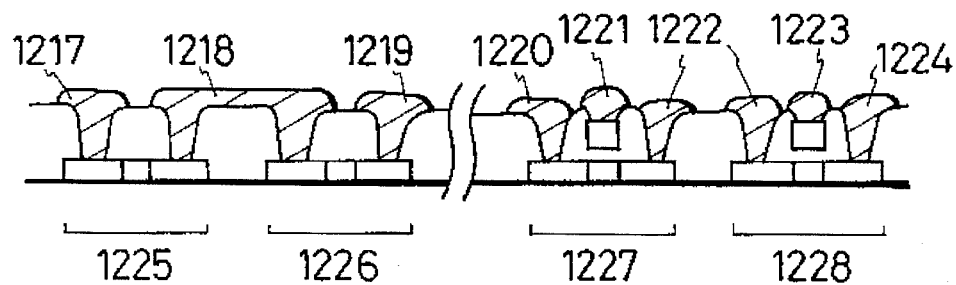

In this embodiment a description will be made on a method for preparing a thin film transistor in reference mainly to the accompanying FIGS. 11 (A) to (E).

At first a silicon oxide film 100 to 300 nm in thickness, which was to be used as a blocking layer, was prepared by a magnetron radio frequency sputtering method on a glass substrate not so expensive as quartz glass but resistant to a heat treatment process of 700° C. or less, more definitely 600° C. The process conditions were an atmosphere of 99.9% or more, substantially 100% oxygen, a film deposition temperature of 15° C., an RF power of 400 to 800 W and a pressure of 0.5 Pa. Quartz or single crystal silicon was employed as a target. The film depositing rate was 3 to 10 nm per minute.

On this film a silicon film was deposited by the low pressure CVD method, the sputtering method or the plasma CVD method. At the time of carrying out the above low pressure CVD method, disilane ($Si_2H_6$) or trisilane ($Si_3H_8$) was supplied to the CVD system at temperatures of 450° to 550° C., that is, at temperatures 100° to 200° C. lower than the crystallization temperature, for instance at 530° C. to form the film. The pressure within the reaction chamber ranged from 30 to 300 Pa. The depositing rate was 5 to 25 nm per minute. In order that the threshold voltages ($V_{th}$) of the n-channel thin film transistor and the p-channel thin film transistor are controlled to be substantially the same, boron can be mixed into the reactive atmosphere in the form of diborane gas so that the film can be doped with boron in concentration of $1 \times 10^{15}$ to $1 \times 10^{18}$ cm$^{-3}$.

In adopting the sputtering method, the back pressure of the sputtering chamber was $1 \times 10^{-5}$ Pa or less. The sputtering was carried out in an atmosphere of argon mixed with 20 to 80% hydrogen with a silicon single crystal as the target. For instance, the atmosphere was 20% of argon and 80% of hydrogen. The film deposition temperature was 150° C. The frequency was 13.56 MHz. The sputtering output was 400 to 800 W. The pressure at the time of film deposition was 0.5 Pa.

In depositing a silicon film by the plasma CVD method, the temperature was, for instance, 300° C. Monosilane ($SiM_4$) or disilane ($Si_2M_6$) was employed. One of these substances was introduced into the PCVD reaction chamber so that a high frequency current of 13.56 MHz was applied for film deposition.

It is desired that the film prepared by these methods has an oxygen concentration of $5 \times 10^{21}$ cm$^{-3}$ or less. Higher oxygen concentrations make it hard to crystallize. In this case the thermal annealing temperature should be higher and the thermal annealing time should be longer. Too low oxygen concentrations make the back light (a light source disposed behind the display device) cause a leakage current, that is, a current flows across the source and the drain although the thin film transistor is in OFF state. Therefore the oxygen concentration ranged from $4 \times 10^{12}$ to $4 \times 10^{20}$ cm$^{-3}$. The hydrogen concentration was $4 \times 10^{20}$ cm$^{-3}$, which is about 1 atomic percent in comparison with the silicon of $4 \times 10^{22}$ cm$^{-3}$. In order to promote crystallization at the source and the drain, the oxygen concentration should be $7 \times 10^{19}$ cm$^{-3}$, or less, preferably $1 \times 10^{19}$ cm$^{-3}$ or less. Oxygen can be added only to the channel forming region of the thin film transistor which constitutes the display element by the ion implantation method so that the oxygen concentration can be $5 \times 10^{20}$ to $5 \times 10^{21}$ cm$^{-3}$. At this time the thin film transistors which constitute peripheral circuits are not irradiated with a light beam. Consequently the amount of oxygen mixed can be made less to obtain a larger carrier mobility so that the device can be operated by high frequency.

Next, a silicon film in an amorphous state was formed into a thickness of 50 to 500 nm, for instance, 150 nm. Then afterwards the film was heat treated to be maintained for 12 to 70 hours at a middle temperature range of 450° to 700° C. in an not oxidizing atmosphere, for instance, at 600° C. in an atmosphere of hydrogen. A silicon oxide film in an amorphous state was formed on the surface of the substrate beneath the silicon film. Consequently the heat treatment did not cause specific nuclei to be generated so that the entire silicon film was annealed uniformly. That is, the film had an amorphous state at the time of the deposition and hydrogen was merely in the state of mixture.

The annealing process caused the silicon film to be transferred from an amorphous structure into a more orderly state. Part of the silicon film presumed a crystalline state. After this silicon film was deposited, the film was prone to be crystallized into a crystalline state especially in the comparatively orderly region. However, an anchoring action of the silicon atoms existing in the regions caused the atoms to attract each other. The measurements by Raman laser spectroscopy showed a shift from a Raman peak of 521 $cm^{-1}$ of the monocrystalline silicon to the lower frequency side. For instance, a peak which had a middle at approximately 515 $cm^{-1}$ was obtained. The apparent grain size of the silicon crystals was 5 to 50 nm, which was figured out from the full width at half maximum of the Raman peak. The size was similar to microcrystalline. Actually the highly crystalline region extend in a large quantity to form a cluster-like structure. A film in a semi-amorphous structure was formed in which each cluster was anchored by silicon atoms.

As a result, the film was in a state in which there were substantially no grain boundaries (hereinafter called GB) of the crystal. Carriers can move with ease from cluster to cluster through the anchored portions so that the film has a higher carrier mobility than polycrystalline silicon which has so-called GBs definitely. Consequently, a hole mobility of 10 to 200 $cm^2/Vs$ and an electron mobility of 15 to 300 $cm^2/Vs$ were obtained.

On the other hand, polycrystallization of the film by high temperature annealing at 900° to 1200° C. instead of the middle temperature annealing as stated above caused segregation of the impurities in the film caused by solid state growth from the nuclei. Consequently impurities, for instance, oxygen, nitrogen or carbon were collected in the GB in a large quantity and made barriers in the GB to hinder the mobility of carriers or to trap the carriers therein despite a great mobility in the crystal. As a result, a carrier mobility of merely 10 $cm^2/Vs$ or less could be obtained. In this embodiment, silicon semiconductors having a semi-amorphous or semi-crystal structure were employed because of the reason stated above. This semiconductor film was subjected to a patterning process by the first photomask to form the semiconductor regions 1101 to 1104. The size of one semiconductor region was, for instance, 10 μm×50 μm.

On this film the silicon oxide film 1105 was formed as a gate insulating film 50 to 200 nm, for instance, 100 nm in thickness. The silicon oxide film was prepared under the same condition as the silicon oxide film to be used as a blocking layer. Mixing of fluorine or fluorine compounds (for instance, hydrogen fluoride or silicon fluoride) in forming the film enables fluorine $10^{15}$ to $10^{19}$ $cm^{-3}$, for instance, $5×10^{16}$ $cm^{-3}$ in concentration to be added in the film so that, for instance, sodium ions can be fixed.

Then, on this film a silicon film doped with phosphorus 1 to $5×10^{21}$ $cm^{-3}$ in concentration was formed. Otherwise, this silicon film and thereon the laminated film 1106 constituted from molybdenum, tungsten, molybdenum silicide and tungsten silicide were formed. Either one of these films was subjected to a patterning process by a second photomask to form the gate electrodes 1107 to 1110. The width of the gate electrode was, for instance, 10 μm. The thickness thereof was 0.5 μm in all, that is, a 0.2 μm thick silicon film doped with phosphorus plus a 0.3 μm thick molybdenum film.

Further, a photoresist was coated all over the layer. The photoresist was subjected to a patterning process by a third photomask. The semiconductor regions 1101 and 1104 were masked so that ions might be implanted into the semiconductor regions 1102 and 1103 only at the time of the ion implantation. Boron was added by the dose of 1 to $5×10^{15}$ $cm^{-2}$ by an ion implantation method to form the p-type impurity regions 1111 to 1114. Likewise, a photoresist was once more coated all over the layer. The photoresist was subjected to a patterning process by a fourth photomask. The semiconductor regions 1102 and 1103 were masked so that ions might be implanted into the semiconductor regions 1101 and 1104 only at the time of ion implantation. Phosphorus was added by the dose of 1 to $5×10^{15}$ $cm^{-2}$ by an ion implantation method to form the n-type semiconductor regions 1115 to 1118.

These processes of ion introduction was carried out through the silicon oxide film. However, the gate electrode can be masked to remove the silicon oxide film on the silicon. Then boron and phosphorus can be implanted directly into the silicon film in the form of ions.

Next, the film was again subjected to thermal insulating annealing at 600° C. for 10 to 50 hours. The source regions and the drain regions of each thin film transistor had the impurities activated to be $P^+$ and $N^+$. Beneath the gate electrode, a channel forming region was formed substantially as an intrinsic (i-type) semi-amorphous semiconductor.

In this way, although a self-aligning method is employed, both of a p-channel or n-channel thin film transistor or either thereof can be prepared without adding heat of 700° C. and more over the entire process. Accordingly, for example, precious quartz can be done away with as a substrate material in preparing the devices. Therefore it can safely be said that this is a process quite suitable for instance, large display devices of liquid crystal.

In this embodiment the thermal annealing process was carried out twice, that is, once at the time of forming the semiconductor region (FIG. 11 (A)) and once more after the process of the ion implantation into the source and drain regions (FIG. 11 (D)). The annealing process before or after the formation of the semiconductor region, however, can be done away with depending upon the characteristics of thin film transistors required. The integration of these two annealing processes into one which is carried out after the ion implantation process can be performed for simplified manufacturing process and shorter production time.

Subsequently as shown in FIG. 11 (E), a silicon oxide film was formed all over the layer by the sputtering method as stated above so that the film could be an layer insulating film. This layer insulating film can be formed from phosphorus glass, boron glass or phosphorus-boron glass instead of the silicon oxide. Further, the vapor phase growth methods, for instance, the low pressure CVD method, the photo assisted CVD method or the atmospheric pressure CVD method were suited for the method of formation of the layer. A method of utilizing a chemical reaction between liquid and solid, for instance, a sol-gel method, allowed a material showing a sufficient property to be obtained. The latter method, that is, the sol-gel method especially, was found to be suited for cost reduction and for realization of larger area of the device. The thickness of the layer insulating film was, for instance, 0.2 to 0.6 μm. The thickness depends upon the size of the thin film transistor. Therefore there are thicker or thinner films available.

Then afterwards, the layer insulating film was provided with a window for forming an electrode by a fifth photomask. Further, an aluminum film was formed all over the film by the sputtering method. A heat-resistant metal, for instance, chromium can be adopted in stead of aluminum. Then aluminum was subjected to a patterning process by a sixth photomask to form the electrodes or leads 1119 to 1128. Thus FIG. 11 (E) was obtained. At this time a signal line (not shown in FIGS. 11 (A) to (E)) which connects the driving circuits and the thin film transistors can be formed simultaneously.

Figure 13:
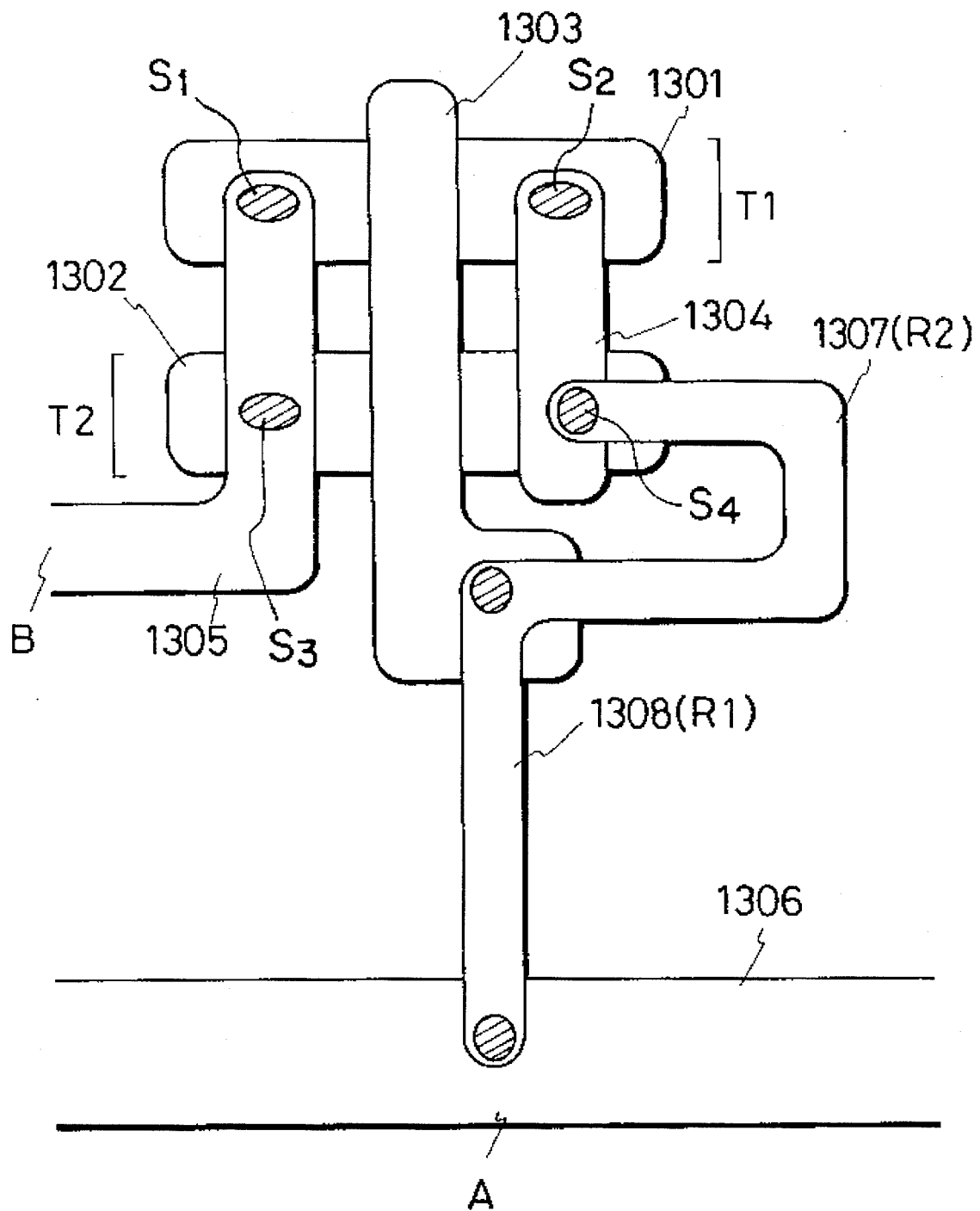
FIG. 13 shows an example of a structure of a protection circuit according to the present invention.
Figure 14A:
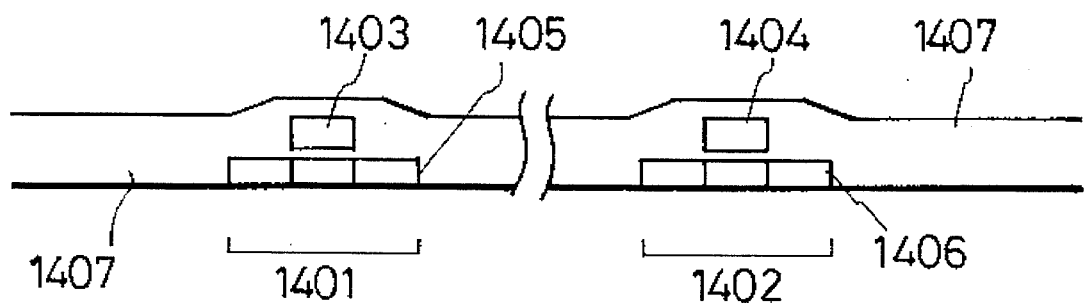
FIGS. 14A, 14B and 14C show a method for preparing a protection circuit according to the present invention.
Figure 14B:
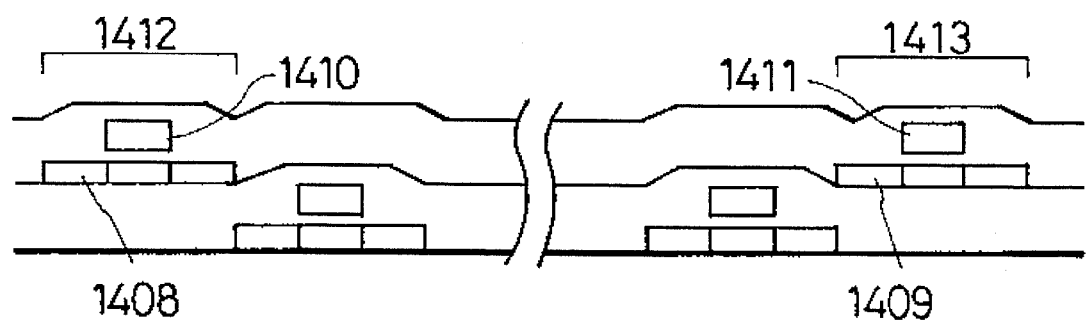
Figure 14C:
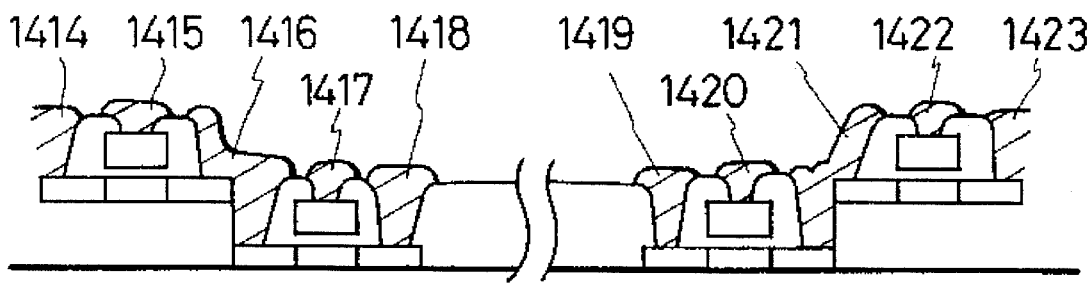
Figure 15A:
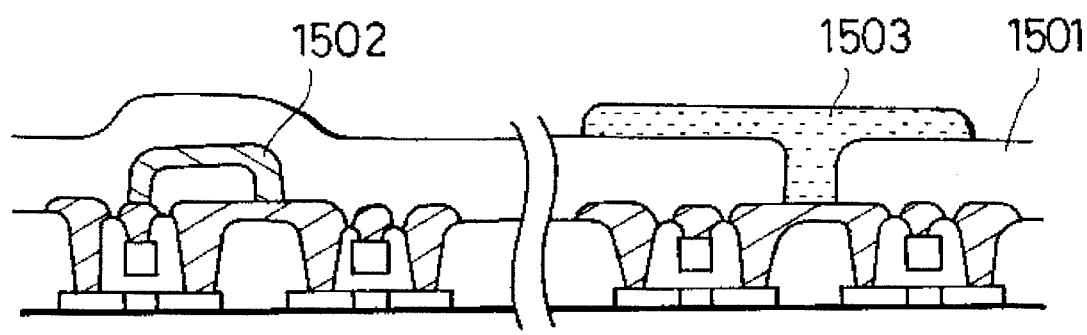
FIGS. 15A and 15B shows an example of a protection circuit according to the present invention.
Figure 15B:
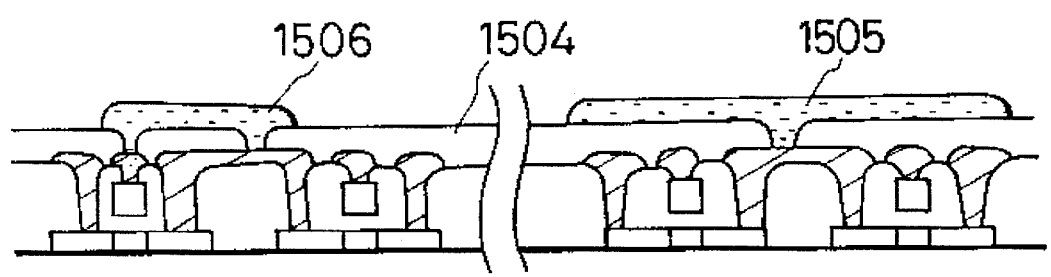

Further in amorphous silicon film $10^2$ to $10^{12}$ $\Omega$-cm, preferably $10^4$ to $10^6$ $\Omega$-cm in resistivity was formed in thickness of, for instance, 30 to 200 nm. Then the film was subjected to a patterning process by a seventh photomask to form the leads 1307 and 1308 which function as a resistance. In FIG. 13, shadowed portions show that the leads are contacted each other. Specifically, as those skilled in the art will appreciate upon review of FIG. 13, electrodes 1304 and 1305 are connected with sources and drains of the transistors $T_1$ and $T_2$ through the shadowed portions $S_1$, $S_2$, $S_3$, and $S_4$. FIGS. 15 (A) and (B) show the cross-sections of the elements prepared by the process stated above. In FIG. 15 (A), reference numeral 1502 shows a resistance lead formed by the amorphous silicon stated above.

Subsequently, the surface was coated with a flattening organic resin 1501, for instance, translucent polyimide resin. The required portion of the display element region had a hole for an electrode bored by an eighth photomask. Further a film of a transparent conductive material, for instance, tin oxide, indium oxide, nickel oxide, zinc oxide or of alloys or compounds thereof, for instance, indium tin oxide (ITO) was formed by the sputtering method. Then this film was subjected to a patterning process without using a photomask, for instance, the laser scribing (laser etching) method. As a matter of course, it is possible to perform a patterning process by using a photomask as ordinarily. A larger area of the display device requires a higher technology for mask positioning. Because increased mask positioning processes mean a lowered yield, a mask positioning process should desirably be avoided. The laser scribing method does away with any mask positioning process. In case a transparent conductive film is subjected to a patterning process, the minimum patterning width possible is 10 times or more as large as the minimum patterning width of 0.3 µm achieved by the laser scribing method. Consequently the laser scribing method is a sufficient and ideal patterning method without lowering the yield. A pixel electrode 1503 was formed by a patterning process as above.

Then this ITO (indium tin oxide) was formed into a film at room temperature to 150° C. and then annealed in oxygen of 200° to 400° C. or in the atmosphere.

Subsequently, display devices were prepared through several kinds of processes, for example, the formation of opposed electrodes or the infusion of liquid crystal in case of liquid crystal devices, required for the preparation of display devices, for instance, liquid display devices. But a description will not be made, because the details are not related directly to the present invention.

PREFERRED EMBODIMENT 2

FIG. 11 (E) was obtained by a method similar to Preferred Embodiment 1. Then as shown in FIG. 15 (B) the surface was coated with a flattening organic resin 1504, for instance, a translucent polyimide resin. The required portions of the regions which contain peripheral protection circuits as well as of the display elements regions are provided with holes for electrodes by an eighth photomask. Further a film of transparent conductive materials, for example, tin oxide, indium oxide, nickel oxide, zinc oxide, or alloys, or compounds thereof, for instance, indium tin oxide (ITO), was formed by a sputtering method. This film was subjected to a patterning process by the use of a ninth photomask. Subsequently a pixel electrode 1501 was formed in the display element region. Also leads (corresponding with 1307 and 1308 in FIG. 13) which function as a resistance were formed in the peripheral region.

The ITO stated above was formed into a film at room temperature to 150° C. and was subjected to an annealing process in an atmosphere of oxygen of 200° to 400° C. or in the atmosphere.

Subsequently, display devices were completed through several kinds of processes, for instance, the formation of opposed electrodes or the infusion of liquid crystal in case of a liquid crystal device, required for the preparation of display devices, for example, liquid crystal devices.

The present invention provides protection to elements, for example, thin film transistors, from surge voltages, the thin film transistors being contained in display devices which are made from liquid crystal, ferroelectric substances or other materials having electro-optical effects. The present invention increases reliability, endurance and lifetime of the display devices stated above.

What is claimed is:

1. An electro-optical device, comprising:

a pair of signal lines having a matrix configuration disposed on a substrate;

a plurality of pixel electrodes formed on the substrate;

at least one thin film transistor disposed at each pixel electrode, with one of an input and output side connected to said pixel electrode and the other of the input side and the output side thereof connected to a first signal line of said pair of signal lines having a matrix configuration, and a gate of said thin film transistor connected to a second signal line of said pair of signal lines having a matrix configuration; and a protective circuit having zener diode characteristics connected to a signal source which is one of said first signal line and said second signal line, to protect said thin film transistor against overvoltages emanating from said signal source, said protective circuit comprising first and second protective TFTs, each with gate, source, and drain connections, and first and second voltage divider means, each of said first and second voltage divider means providing a respective first resistance and a second resistance;

such that the drain of said first protective TFT is connected to a terminal other than said first signal line and said second signal line, said source of said first protective TFT is connected through said first voltage divider means to said signal source so that the first resistance of said first voltage divider means is interposed between said first protective TFT source and said signal source, and said gate of said first protective TFT is connected through said first voltage divider means to said signal source so that said second resistance of said first voltage divider means is provided between said first protective TFT gate and said signal source, and such that said drain of said second protective TFT is operably connected to said signal source, said source connection of said second protective TFT is connected through said second voltage divider means to said terminal so that said first resistance of said second voltage divider means is provided between said second protective TFT source connection and said terminal, with said gate of said second protective TFT connected through said second voltage divider means to said terminal so that said second resistance of said second voltage divider means is provided between said second protective TFT gate and said terminal; and wherein values of said first and second resistances of the first and second voltage divider means, respectively, are selected to provide a current diverting operation of said first and second protective TFTs at predetermined overvoltage levels.

2. The electro-optical device of claim 1 wherein a plurality of said protective circuits are connected between the signal source and the thin film transistor.

3. An electro-optical device, comprising:

a pair of signal lines having a matrix configuration disposed on a substrate;

a plurality of pixel electrodes formed on the device;

at least one thin film transistor disposed at each pixel electrode, with one of an input and output side connected to said pixel electrode and the other of the input side and the output side thereof connected to a first signal line of said pair of signal lines having a matrix configuration, and a gate of said thin film transistor connected to a second signal line of said pair of signal lines having a matrix configuration; and a protective circuit having zener diode characteristics connected to a signal source which is one of said first signal line and said second signal line, to protect said transistors against overvoltages emanating from said signal source, said protective circuit comprising an N-channel protective TFT and a P-channel protective TFT, with input terminals, output terminals, and gate terminals respectively of each protective TFT being mutually connected, and a voltage divider means for providing a first resistance and a second resistance;

wherein said output terminals of said protective TFTs are connected to a terminal other than said first signal line and said second signal line and input terminals of said protective TFTs are connected through said first resistance of said voltage divider means to said signal source, and said gates of said protective TFTs are connected through said second resistance of said voltage divider means to said signal source, and wherein values of said first and second resistances of the voltage divider means are selected to provide a current diverting operation of said first and second protective TFTs at a predetermined overvoltage level.

4. The electro-optical device of claim 3, wherein a plurality of said protective circuits are connected between the signal source and the protected thin film transistors.

5. An electro-optical device, comprising:

a plurality of pixel electrodes formed on a substrate;

thin film transistors provided at said pixel electrodes to switch said pixel electrodes;

a pair of signal lines having a matrix configuration disposed on said substrate, and signal lines being connected to said thin film transistors to supply signals thereto;

a protective circuit connected to a signal source which is one of said signal lines to protect said thin film transistors against overvoltage emanated from said signal source, said protective circuit comprising a protective TFT and a voltage dividing means having series connected two resistances, such that said protective TFT and said two resistances are connected in series between said signal source and a terminal other than said signal lines;

one of the source and drain regions of said protective TFT is connected to either one of said signal source or said terminal;

the other one of the source and drain regions is connected to one end of said series connected two resistances; and a gate of said protective TFT is connect to a point between said two resistances, wherein the values of said two resistances are respectively selected to provide a current diverting operation of said protective TFT at a predetermined overvoltage level.

6. An electro-optical device comprising:

a pair of signal lines having a matrix configuration disposed on a substrate;

a plurality of pixel electrodes provided on said substrate;

at least one transistor disposed at each pixel electrode, with one of an input and output side connected to said pixel electrode and the other of the input and output side thereof connected to a first signal line of said pair of signal lines having a matrix configuration, and a gate of said transistor connected to a second signal line of said pair of signal lines having a matrix configuration; and a protective circuit having zener diode characteristics connected to a signal source which is one of said first signal line and said second signal line, to protect said transistor against overvoltages emanating from said signal source, said protective circuit comprising a protective TFT and a voltage divider means, said divider means providing a first resistance and a second resistance, such that a drain of said protective TFT is connected to a terminal other than said signal source, a source of said protective TFT is connected through said divider means to said signal source so that said first resistance is interposed between said source of said protective TFT and said signal source, and a gate of said protective TFT is connected through said divider means to said signal source so that said second resistance is provided between said gate and said signal source, wherein values of said first and second resistances are selected to provide a current diverting operation of said protective TFT at predetermined overvoltage levels.

7. An electro-optical device comprising:

a pair of signal lines having a matrix configuration disposed on a substrate;

a plurality of pixel electrodes provided on said substrate;

at least one transistor disposed at each pixel electrode, with one of an input and output side connected to said pixel electrode and the other of the input and output side thereof connected to a first signal line of said pair of signal lines having a matrix configuration, and a gate of said transistor connected to a second signal line of said pair of signal lines having a matrix configuration; and a protective circuit having zener diode characteristics and comprising a first protective circuit portion and a second protective circuit portion, each of said first protective circuit portion and said second protective circuit portion being connected between a signal source which is one of said first signal line and said second signal line, and a terminal other than said signal source, to protect said transistor against overvoltages emanating from said signal source, each of said first and second protective circuit portions comprising first and second protective transistors and first and second voltage divider means, each of said first and second voltage divider means providing a respective first resistance and a second resistance;

such that a drain of said first protective transistor is connected to said terminal, a source of said first protective transistor is connected through said first voltage divider means to said signal source so that said first resistance of said first voltage divider means is interposed between said first protective transistor source and said signal source, and a gate of said first protective transistor is connected through said first voltage divider means to said signal source so that said second resistance is provided between said first protective transistor gate and said signal source; and such that a drain of said second protective transistor is operably connected to said signal source, a source of said second protective transistor is connected through said second voltage divider means to said terminal so that said first resistance of said second voltage divider means is provided between said second protective transistor source and said terminal, with a gate of said second protective transistor connected through said second voltage divider means to said terminal so that said second resistance of said second voltage divider means is provided between said second protective transistor gate and said terminal; and wherein values of said first and second resistances of the first and second voltage divider means, respectively, are selected to provide a current diverting operation of said first and second protective transistors at predetermined overvoltage levels.

8. An electro-optical device comprising:

a pair of signal lines having a matrix configuration disposed on a substrate;

a plurality of pixel electrodes provided on said substrate;

at least one transistor disposed at each pixel electrode, with one of an input and output side connected to said pixel electrode and the other of the input and output side thereof connected to a first signal line of said pair of signal lines having a matrix configuration, and a gate of said transistor connected to a second signal line of said pair of signal lines having a matrix configuration; and a protective circuit having zener diode characteristics and comprising a first protective circuit portion and a second protective circuit portion, each of said first protective circuit portion and said second protective circuit portion being connected between a signal source which is one of said first signal line and said second signal line, and a terminal other than said signal source, to protect said transistor against overvoltages emanating from said signal source, each of said first protective circuit portion and said second protective circuit portion comprising an N-channel protective transistor and a P-channel protective transistor and a voltage divider means for providing a first resistance and a second resistance, with input terminals, output terminals and gates respectively of said N-channel protective transistor and said P-channel protective transistor being mutually connected in each of said first protective circuit portion and said second protective circuit portion, wherein said output terminals of said N-channel transistor and said P-channel transistor of each of said first and second protective circuit portions are connected to said terminal other than said signal source, and input terminals of said N-channel transistor and said P-channel transistor of each of said first and second protective circuit portions are connected through said first resistance of the corresponding voltage divider means to said signal source, and said gates of said N-channel transistor and said P-channel transistor of each of said first and second protective circuit portions are connected through said second resistance of the corresponding voltage divider means to said signal source, and wherein values of said first and second resistances of the voltage divider means of each of said first and second protective circuit portions are selected to provide a current diverting operation of the corresponding N-channel transistor and P-channel transistor.